(12) United States Patent
Chen et al.

(10) Patent No.: US 11,705,604 B2
(45) Date of Patent: *Jul. 18, 2023

(54) BATTERY MODULE WITH FIREPROOF AND FIRE-EXTINGUISHING COMPONENTS

(71) Applicant: CONTEMPORARY AMPEREX TECHNOLOGY CO., LIMITED, Ningde (CN)

(72) Inventors: Xingdi Chen, Ningde (CN); Kaijie You, Ningde (CN); Weilong Lin, Ningde (CN); Jun Ma, Ningde (CN); Yuepan Hou, Ningde (CN); Ziyuan Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 12 days.

This patent is subject to a terminal disclaimer.

(21) Appl. No.: 16/507,318

(22) Filed: Jul. 10, 2019

(65) Prior Publication Data
US 2020/0287180 A1   Sep. 10, 2020

(30) Foreign Application Priority Data
Mar. 7, 2019   (CN) .......................... 201910173449.0

(51) Int. Cl.
*H01M 10/00*   (2006.01)
*H01M 50/383*   (2021.01)
(Continued)

(52) U.S. Cl.
CPC ....... *H01M 50/383* (2021.01); *H01M 50/271* (2021.01); *H01M 50/507* (2021.01);
(Continued)

(58) Field of Classification Search
CPC ............. H01M 2/1077; H01M 2/1094; H01M 2/1247; H01M 2/20; H01M 2/202;
(Continued)

(56) References Cited

U.S. PATENT DOCUMENTS 7,887,941 B2* 2/2011 Horikoshi ............. H01M 2/347
429/82
11,094,994 B2* 8/2021 Chen ................... H01M 50/394
(Continued)

FOREIGN PATENT DOCUMENTS

CN   205542960 U   8/2016
CN   108011064 A   5/2018
(Continued)

OTHER PUBLICATIONS

Search report in corresponding EP19182332.7 dated Jan. 14, 2020 (pp. 1-9).
(Continued)

*Primary Examiner* — Nicholas P D'Aniello
(74) *Attorney, Agent, or Firm* — Millen, White, Zelano & Branigan, P.C.; William Nixon; Wan-Ching Montfort

(57) ABSTRACT

The present disclosure relates to a battery module including at least one battery unit array structure, an upper cover, a lower cover and a fireproof component disposed vertically. Each battery unit array structure includes a plurality of battery units and a plurality of busbars electrically connected to the plurality of battery units. The battery unit array structure is disposed between the upper cover and the lower cover. Each battery unit of each battery unit array structure is provided with a vent facing towards the fireproof component. Different from the related art, when thermal runaway occurs in a battery unit according to the present disclosure, flame and high-temperature particles ejected from a vent of a battery unit are blocked by the fireproof
(Continued)

component from burning adjacent battery units, thereby preventing the thermal runaway in the other battery units from being triggered by the existing thermal runaway.

8 Claims, 8 Drawing Sheets

(51) Int. Cl.
*H01M 50/271* (2021.01)
*H01M 50/507* (2021.01)
*H01M 50/227* (2021.01)
*H01M 50/209* (2021.01)
*H01M 50/224* (2021.01)

(52) U.S. Cl.
CPC ........ *H01M 50/209* (2021.01); *H01M 50/224* (2021.01); *H01M 50/227* (2021.01); *H01M 2220/20* (2013.01)

(58) Field of Classification Search
CPC .... H01M 2/206; H01M 50/20; H01M 50/383; H01M 50/502; H01M 2220/20; H01M 50/24; H01M 50/30; H01M 2200/00; H01M 50/271; H01M 50/507; H01M 50/209; H01M 50/224; H01M 50/227; Y02E 60/10; A62C 3/01; A62C 3/16
See application file for complete search history.

(56) References Cited

U.S. PATENT DOCUMENTS

| | | | |
|---|---|---|---|
| 11,251,487 B2* | 2/2022 | Wang | H01M 50/30 |
| 2009/0162737 A1* | 6/2009 | Lai | H01M 10/637 |
| | | | 429/56 |
| 2011/0318618 A1* | 12/2011 | Yajima | H01M 10/6551 |
| | | | 429/72 |
| 2012/0308873 A1* | 12/2012 | Sekino | H01M 50/20 |
| | | | 429/156 |
| 2013/0252037 A1* | 9/2013 | Chiba | F16K 17/16 |
| | | | 429/53 |
| 2015/0072207 A1* | 3/2015 | Soleski | B60L 58/21 |
| | | | 429/121 |
| 2015/0162578 A1* | 6/2015 | Kim | H01M 50/308 |
| | | | 429/82 |
| 2015/0171388 A1 | 6/2015 | Jang et al. | |
| 2016/0218333 A1 | 7/2016 | Takasaki et al. | |
| 2017/0373287 A1* | 12/2017 | Yamashita | H01M 50/35 |
| 2018/0269440 A1* | 9/2018 | Lee | H01M 2/1072 |

FOREIGN PATENT DOCUMENTS

| | | | |
|---|---|---|---|
| CN | 207409556 U | 5/2018 | |
| CN | 108110171 A | 6/2018 | |
| CN | 108615835 A | 10/2018 | |
| CN | 108615838 A | 10/2018 | |
| CN | 208315702 U | 1/2019 | |
| CN | 109428027 A | 3/2019 | |
| CN | 209447890 U | 9/2019 | |
| CN | 107093686 B | 4/2020 | |
| JP | 3218586 U | 10/2018 | |

OTHER PUBLICATIONS

Von Roll: "Energy Storage Solutions Battery Protection", Dec. 20, 2019 (Dec. 20, 2019), XP055654589, Retrieved from the Internet: URL:https://www.vonroll.com/userfiles/down loads/ 1435128730441199/Energy Storage Solu tions BatteryProtection Flyer-web.pdf- [retrieved on Dec. 20, 2019] pp. 1-4.
International Search Report PCT/CN2020/076479 dated May 13, 2020 (pp. 1-5).

* cited by examiner

BATTERY MODULE WITH FIREPROOF AND FIRE-EXTINGUISHING COMPONENTS

CROSS-REFERENCE TO RELATED APPLICATIONS

The present application claims priority to Chinese Patent Application No. 201910173449.0, filed on Mar. 7, 2019, the content of which is incorporated herein by reference in its entirety.

TECHNICAL FIELD

The present disclosure relates to the technical field of energy storage devices, and in particular, relates to a battery module and a battery pack.

BACKGROUND

In recent years, with a continuous increasing of energy density of battery unit, it is urgent to improve the safety of the battery unit in the development of electric vehicles, and the thermal runaway is a focused issue in the research about safety of the battery unit. A battery pack, as the power resource of electric vehicles, is usually installed in the chassis of the electric vehicles. The battery pack includes a plurality of battery modules, and each battery module includes a plurality of battery units arranged in series and a plurality of bus bars electrically connected to the plurality of battery units.

In the related art, the battery module of the battery pack is provided with no fireproof component. When the thermal runaway occurs in the battery unit, a vent of the battery unit may eject flame and high-temperature particles, and the flame and high-temperature particles are likely to burn adjacent battery units, causing a chain reaction. In this way, a more serious safety accident may occur in the whole battery pack.

SUMMARY

In view of above, the present disclosure provides a battery module and a battery pack, aiming to solve the technical problems in the related art.

According to a first aspect of the present disclosure, a battery module is provided. The battery module includes: at least one battery unit array structure, each of the at least one battery unit array structure includes a plurality of battery units and a plurality of busbars electrically connected to the plurality of battery units; an upper cover; a lower cover, the at least one battery unit array structure being disposed between the upper cover and the lower cover; and a fireproof component disposed vertically. Each of the plurality of battery units in each of the at least one battery unit array structure is provided with a vent facing towards the fireproof component.

As a preferable structure of the present disclosure, the at least one battery unit array structure includes two or more battery unit array structures including a first battery unit array structure and a second battery unit array structure. The vent of each of the plurality of battery units of the first battery unit array structure and the vent of each of the plurality of battery units of the second battery unit array structure both face towards the fireproof component, and the fireproof component is disposed between the vent of each of the plurality of battery units of the first battery unit array structure and the vent of each of the plurality of battery units of the second battery unit array structure.

As a preferable structure of the present disclosure, the fireproof component includes a fireproof main body, and a first extension portion connected to an upper end of the fireproof main body and extending towards the first battery unit array structure.

As a preferable structure of the present disclosure, the fireproof component further includes a second extension portion connected to the upper end of the fireproof main body and extending towards the second battery unit array structure.

As a preferable structure of the present disclosure, the battery module further includes a fire-extinguishing component. The fire-extinguishing component is provided below the at least one battery unit array structure, and the fire-extinguishing component is provided with a fluid passageway for storing a fire-extinguishing liquid.

As a preferable structure of the present disclosure, the fireproof main body, the first extension portion and the second extension portion are formed into one piece.

As a preferable structure of the present disclosure, the fireproof component includes a fireproof main body, and a third extension portion connected to an upper end of the fireproof main body and extending towards the plurality of battery units; and/or the fireproof component includes the fireproof main body, and a fourth extension portion connected to a lower end of the fireproof main body and extending towards the plurality of battery units.

As a preferable structure of the present disclosure, one battery unit array structure of the at least one battery unit array structure further includes a collecting plate. The collecting plate is disposed at a side of the one battery unit array structure and connected to the plurality of battery units of the one battery unit array structure.

As a preferable structure of the present disclosure, the fireproof component has a melting point higher than or equal to 500° C.

As a preferable structure of the present disclosure, the fireproof component is made of a mica plate.

As a preferable structure of the present disclosure, the fireproof component is made of mica.

In order to solve the above technical problem, a second aspect of the present disclosure provides a battery pack is provided. The battery pack includes an accommodating box, and a plurality of battery modules accommodated in the accommodating box. One of the plurality of battery modules is the battery module according to the first aspect.

Different from the related art, in the above technical solutions, all the vents of the plurality of battery units of the battery unit array structures face towards the fireproof component. When thermal runaway occurs in a specific battery unit, flame and high-temperature particles ejected from a vent of the battery unit are blocked by the fireproof component from burning adjacent battery units, thereby preventing the thermal runaway in the other battery units from being triggered by the existing thermal runaway.

REFERENCE SINGS 1. battery module
    10 battery unit array structure
        101 first battery unit array structure
        102 second battery unit array structure
    11 battery unit
        111 electrode assembly
            1111 first electrode plate
            1112 second electrode plate
            1113 separator
            1114 flat surface
        112 battery casing
            1121 first surface
            1122 second surface
        113 electrode terminal connector
        114 cover plate
        115 electrode terminal
        116 vent
    12 busbar
    13 upper cover
    14 lower cover
    15 collecting plate
    16 end plate
    17 fireproof component
        171 fireproof main body
        172 first extension portion
        173 second extension portion
        174 third extension portion
        175 fourth extension portion
    18 fire-extinguishing component
2 box cover
3 box body
    31 fixing beam
4 pressing bar
5 high-temperature particles.

DESCRIPTION OF EMBODIMENTS

The technical solutions will be described in detail below with reference to specific embodiments and accompanying drawings in term of technical content, structural features, and objects and effects.

The terms "first", or "second" in the description are used for a purpose of description only, but not intended to indicate or imply relative importance thereof. Unless otherwise specified or stated, term "a plurality of" means two or more, terms "connected", "fixed", etc. shall be understood in a broad sense. For example, the term "connected" includes various connection manners, such as fixed connection, detachable connection, integrated connection, electrical connection, direct connection or indirect connection via an intermediate medium. Those skilled in the art are able to understand specific meanings of the above terms in accordance with specific circumstances.

It should be understood that terms indicating orientations or positions, such as "upper", "lower", "left", "right", etc., generally are used to describe the orientations or positions with reference to the drawings, and thus should not be construed as a limitation of the present disclosure. It also should be understood that when an element is referred as being "on" or "under" another element, the element can be directly located "on" or "under" another element or connected to another element with an intermediate element.

Figure 1:
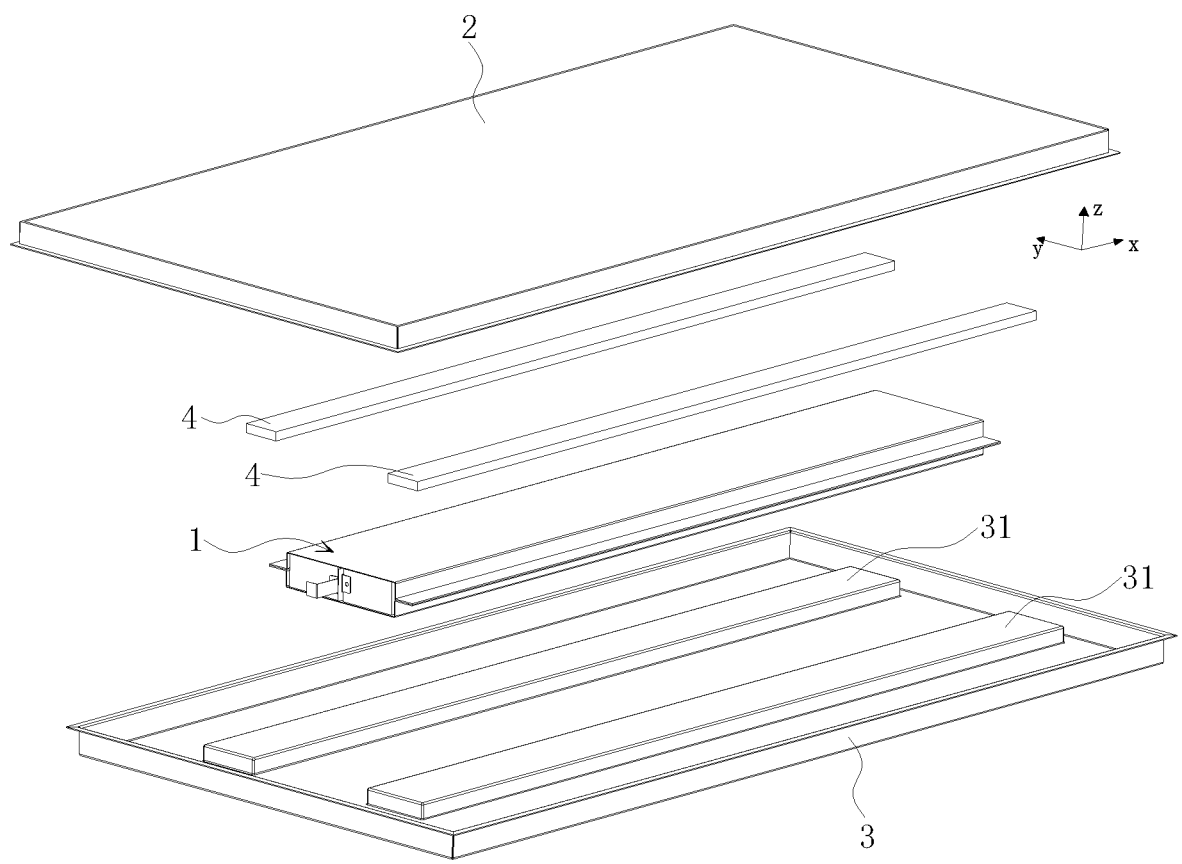
FIG. 1 is an exploded view of a battery pack according to a specific embodiment.

FIG. 1 illustrates a battery pack according to an embodiment. The battery pack includes an accommodating box and a plurality of battery modules 1 disposed in the accommodating box. The plurality of battery modules 1 can be arranged either along a horizontal direction (a length direction indicated by arrow x or a width direction indicated by arrow y), or along a vertical direction (a direction indicated by arrow z).

In an example, the accommodating box includes a box cover 2 and a box body 3. A plurality of fixing beams 31 is provided on the box body 3. In another embodiment, the fixing beams 31 can also be provided on the box cover 2. In the present embodiment, the fixing beams 31 can be protruding beams that protrude upwards from the bottom of the box body 3, or act as separate components that are welded on the bottom of the box body 3.

The battery pack further includes pressing bars 4. The pressing bars 4 press both ends of the battery module 1 against the fixing beams 31, so as to fix the battery module 1 to the box body 3. In this case, the battery module 1 is fixed by the pressing bars 4.

Figure 2:
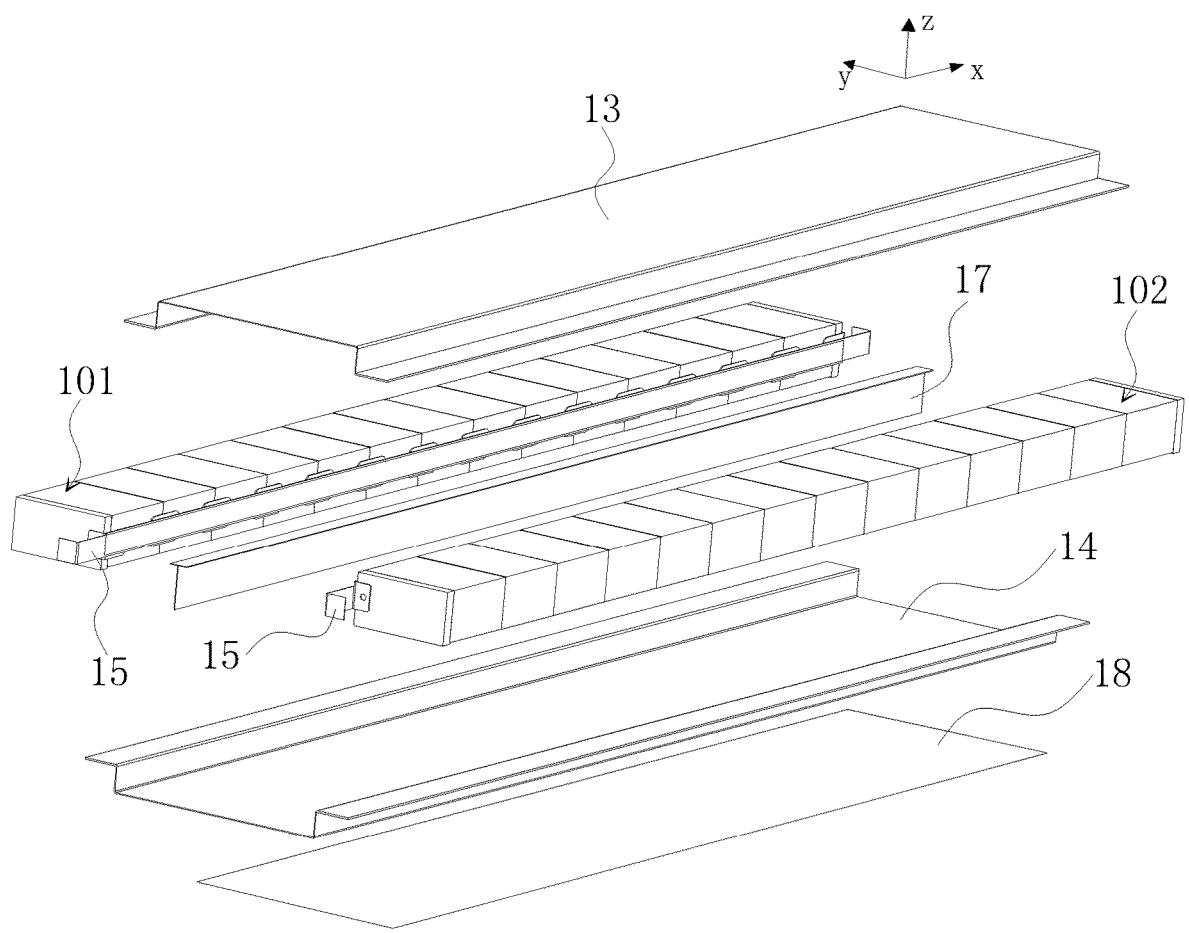
FIG. 2 is an exploded view of a battery module according to a specific embodiment.

In an embodiment as shown in FIG. 2, the battery module 1 includes an upper cover 13, a lower cover 14, a fireproof component 17, a fire-extinguishing component 18, and two battery unit array structures 10 (or more than two battery unit array structures 10). One of the two battery unit array structures 10 is a first battery unit array structure 101, and the other one is a second battery unit array structure 102. Both the first battery unit array structure 101 and the second battery unit array structure 102 are disposed between the upper cover 13 and the lower cover 14.

In the present embodiment, each of the first battery unit array structure 101 and the second battery unit array structure 102 includes fourteen battery units 11 arranged along the length direction (indicated by arrow x). A number, length, height, volume and the like of the battery units 11 can be adjusted as needed.

In another embodiment, the battery module 1 includes only one battery unit array structure 10, and each battery unit 11 in the battery unit array structure 10 is provided with a vent 116 facing towards the fireproof component 17.

The fireproof component 17 is disposed vertically. The vents 116 of the first battery unit array structure 101 and the vents 116 of the second battery unit array structure 102 all face towards the fireproof component 17, and the fireproof component 17 is disposed between the vents 116 of the first battery unit array structure 101 and the vents 116 of the second battery unit array structure 102.

In this case, as the fireproof component 17 is disposed between the vents 116 of the first battery unit array structure 101 and the vents 116 of the second battery unit array structure 102, the fireproof component 17 separates the battery units 11 of the first battery unit array structure 101 from the battery units 11 of the second battery unit array structure 102, thereby preventing the existing thermal runaway in some battery units from triggering the thermal runaway in adjacent battery units.

In an example, the fire-extinguishing component 18 is provided below the battery unit array structure 10, and the fire-extinguishing component 18 is provided with a fluid passageway for storing a fire-extinguishing liquid. The fire-extinguishing component 18 extends along a direction in which the battery units 11 are arranged, and has a length in the length direction (indicated by arrow x) that is substantially same as or different from that of the battery unit array structure 10.

In this embodiment, the fire-extinguishing component 18 is disposed below the lower cover 14, and the fire-extinguishing liquid can be provided inside the fire-extinguishing component 18. In this way, on the one hand, during a normal operating process of the battery module 1, the fire-extinguishing liquid serves as a cooling liquid used for cooling the battery units 11 of the battery unit array structure 10; and on the other hand, when the thermal runaway occurs and the battery unit 11 is on fire, the fire-extinguishing component 18 melts and releases the fire-extinguishing liquid to extinguish the flame, thereby reducing the damage caused by the thermal runaway of the battery unit 11.

Figure 3:
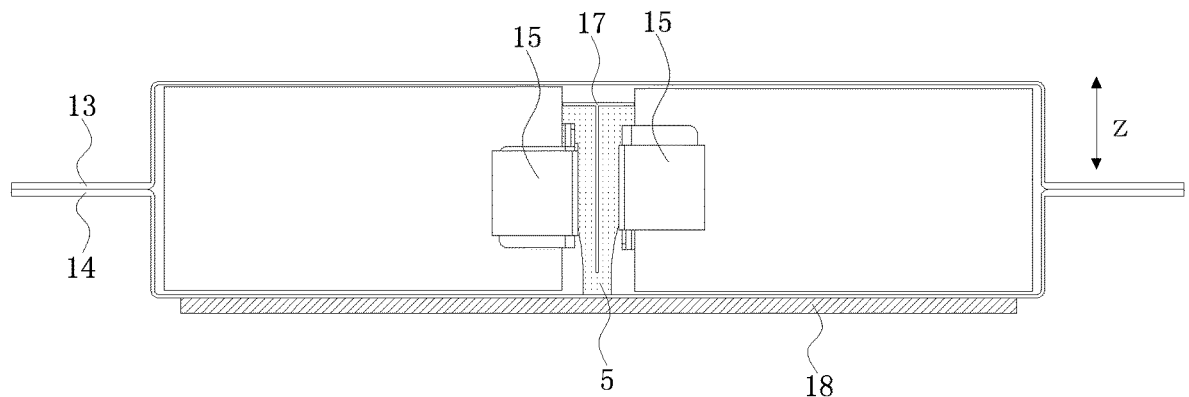
FIG. 3 is a cross-sectional view of a battery module according to a specific embodiment.

As shown in FIG. 3, when the thermal runaway occurs in the battery unit 11 (the battery unit 11 of the first battery unit array structure 101 or the battery unit 11 of the second battery unit array structure 102), the vent 116 is broken to eject flame and high-temperature particles 5. At this time, the flame and the high-temperature particles 5 are ejected from the battery unit 11 in a horizontal direction (either the length direction indicated by arrow x or the width direction indicated by arrow y), and blocked by the fireproof component 17. Thus, the high-temperature particles 5 fall, and burn through the lower cover 14 as well as the fire-extinguishing component 18, such that the fire-extinguishing liquid in the fire-extinguishing component 18 cool the high-temperature particles 5. In this way, the damage to the battery units 11 caused by the thermal runaway can be reduced.

Figure 4:
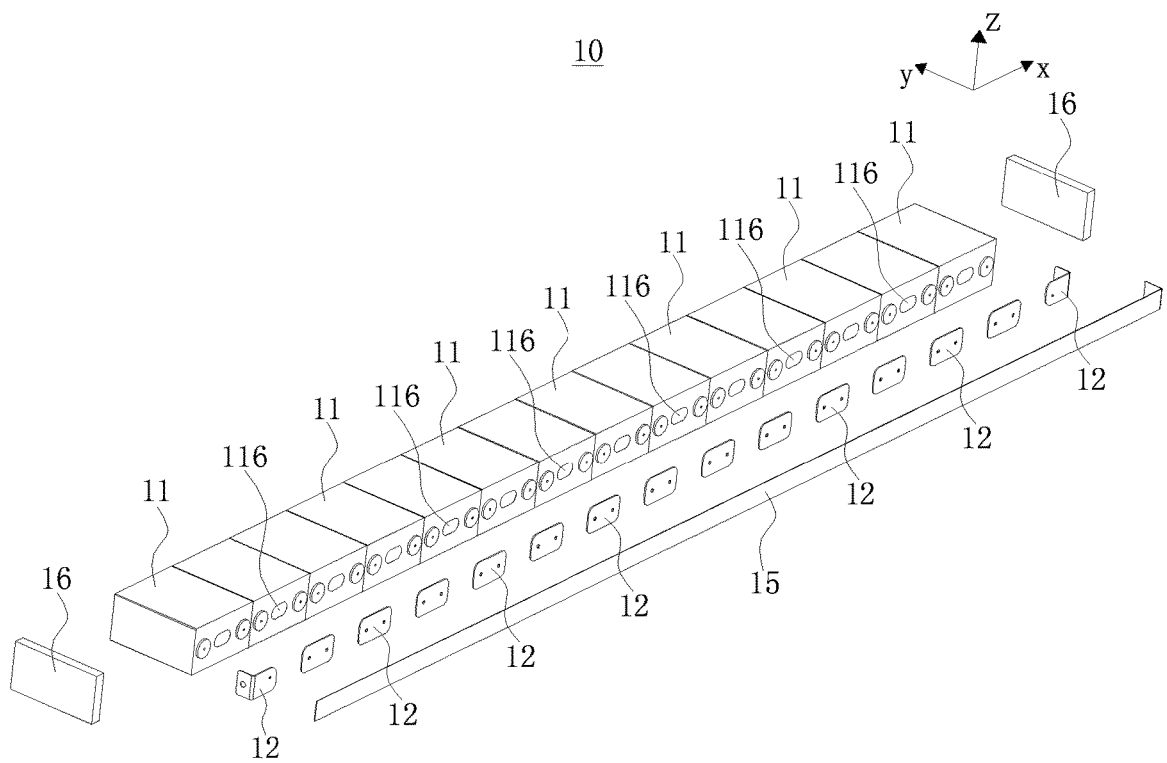
FIG. 4 is an exploded view of a battery unit array structure according to a specific embodiment.
Figure 5:
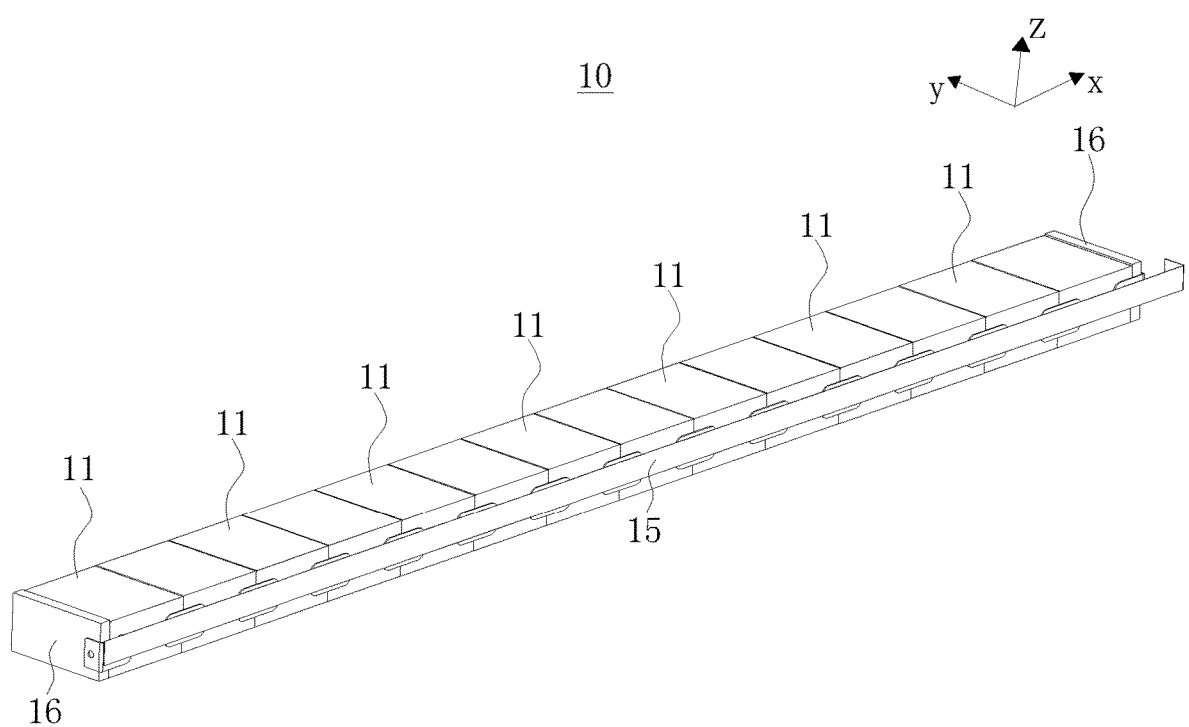
FIG. 5 is a schematic structural diagram of a battery unit array structure according to a specific embodiment.

In an embodiment shown in FIG. 4 and FIG. 5, the battery unit array structure 10 includes a plurality of battery units 11 and a plurality of busbars 12 electrically connected to the plurality of battery units 11. The plurality of battery units 11 is arranged in the horizontal direction (the length direction indicated by arrow x or the width direction indicated by arrow y). A collecting plate 15 is vertically disposed at a side of the battery unit array structure 10, and the collecting plate 15 is connected to the battery units 11 in the battery unit array structure 10.

In the present embodiment, the battery unit array structure 10 further includes two end plates 16, and the two end plates 16 are respectively located at two ends of the plurality of battery units 11 in the horizontal direction (the length direction indicated by arrow x or the width direction indicated by arrow y).

In a specific embodiment, a side surface of the battery unit 11 is applied with glue and is bonded to an adjacent battery unit 11. The plurality of battery units 11 is provided with the end plates 16 at the two ends, so as to form the battery unit array structure 10. The battery units 11 are electrically connected to one another via the busbars 12. The collecting plate 15 is provided at the positions of busbars 12 of the battery unit array structure 10. The battery unit array structure 10 lies on the lower cover 14, a lower surface of the battery unit array structure 10 is fixed to the lower cover 14 through a structural adhesive, and an upper surface of the battery unit array structure 10 is fixed to the upper cover 13 through a structural adhesive.

Figure 6:
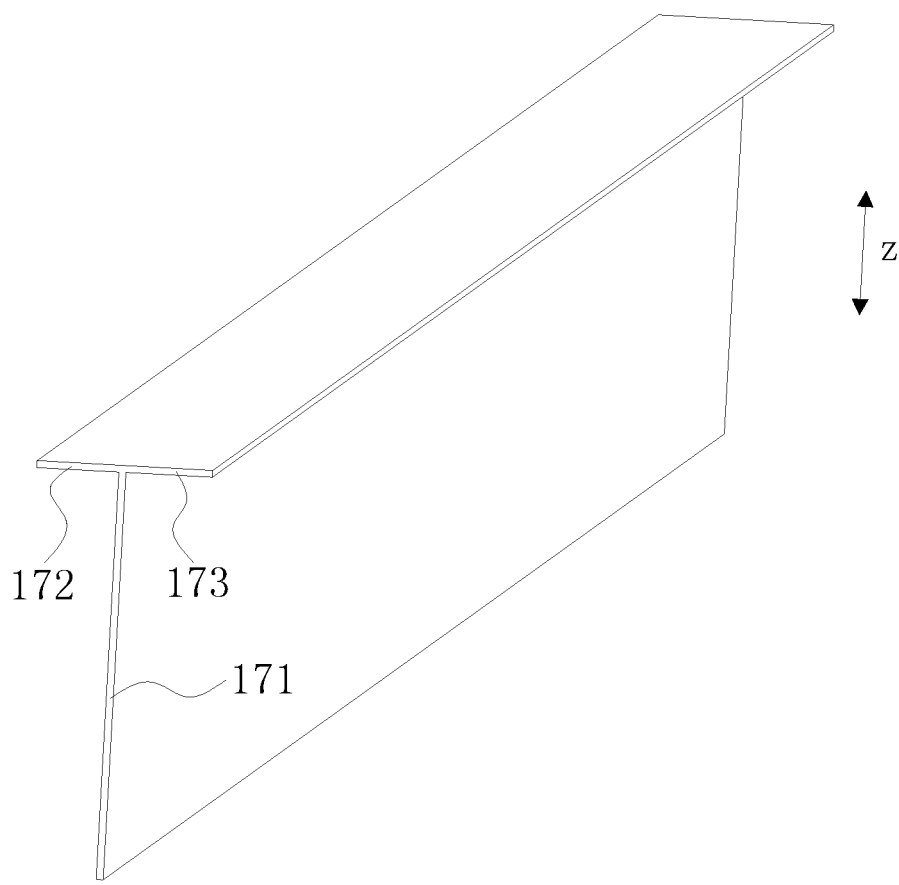
FIG. 6 is a schematic structural diagram of a fireproof component according to a specific embodiment.

In an embodiment shown in FIG. 6, the fireproof component 17 includes a fireproof main body 171, and a first extension portion 172 connected to an upper end of the fireproof main body 171 and extending towards the first battery unit array structure 101.

The fireproof component 17 further includes a second extension portion 173 connected to the upper end of the fireproof main body 171 and extending towards the second battery unit array structure 102. In the present embodiment, the first extension portion 172 extends in the direction facing towards the first battery unit array structure 101, and the second extension portion 173 extends in the direction facing towards the second battery unit array structure 102. However, the extension of the first extension portion 172 and the second extension portion 173 are not limited to the extension in the horizontal direction (the length direction indicated by arrow x or the width direction indicated by arrow y) as shown in FIG. 6. It is possible that the first extension portion 172 and the second extension portion 173 extend obliquely upward and downward, or extend along an arc or the like.

In the present embodiment, for example, the fireproof component 17 is T-shaped. Through the cooperation between the T-shaped fireproof component 17 and the fire-extinguishing component 18, not only the flame and the high-temperature particles 5 can be prevented from being ejected upwards in a vertical direction (a direction indicated by arrow z) and endangering the passenger compartment, but also the flame and high-temperature particles 5 can be ejected downwards to cause melting of the fire-extinguishing component 18, further reducing the damage to the battery units 11 caused by the thermal runaway.

In an example, the fireproof main body 171, the first extension portion 172 and the second extension portion 173 are formed into one piece. In this way, the processing of the fireproof component 17 can be simplified.

Figure 7:
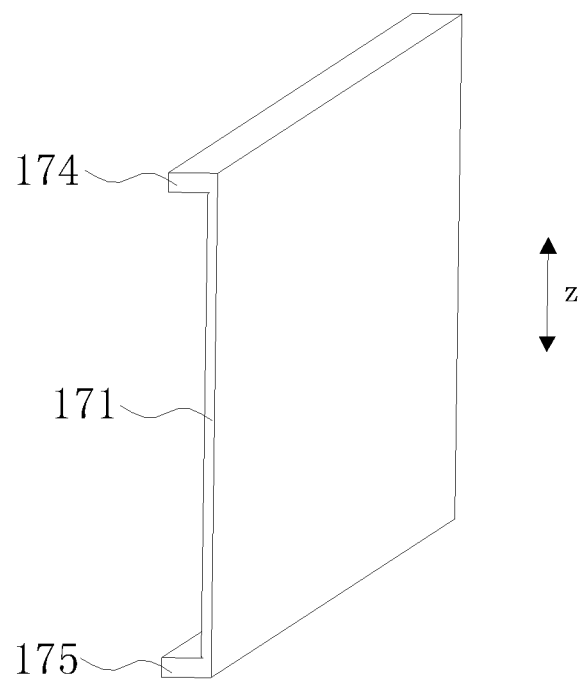
FIG. 7 is a schematic structural diagram of a fireproof component according to another specific embodiment.

In another embodiment shown in FIG. 7, the fireproof component 17 includes a fireproof main body 171 and a third extension portion 174 connected to an upper end of the fireproof main body 171, and the third extension portion 174 extends towards the battery unit 11; and/or the fireproof component 17 includes a fireproof main body 171 and a fourth extension portion 175 connected to a lower end of the fireproof main body 17, and the fourth extension portion 175 extends towards the battery unit 11.

In another embodiment shown in FIG. 7, the fireproof component 17 includes a fireproof main body 171, a third extension portion 174, and a fourth extension portion 175. The positions and shapes of the third extension portion 174 and the fourth extension portion 175 are not specifically limited, as long as the third extension portion 174 is configured to prevent the flame and high-temperature particles 5 from being ejected upwards in the vertical direction (the direction indicated by arrow z) and the fourth extension portion 175 is configured to prevent the flame and high-temperature particles 5 from being ejected downwards in the vertical direction (the direction indicated by arrow z), i.e., both acting as protections. Other embodiment, in which the flame and high-temperature particles 5 can be blocked from burning and damaging the adjacent battery units, shall fall within the protection scope of the present disclosure.

It should be noted that the above-mentioned fireproof component 17 can include any combination of the first extension portion 172, the second extension portion 173, the third extension portion 174, and the fourth extension portion 175. In practical applications, the shape of the fireproof component 17 can be adjusted according to the actual situation, in order to achieve the optimal effect. The shape of the fireproof component 17 is not limited to the shape shown in the present embodiment.

The fireproof component 17 has a melting point higher than or equal to 500 □, such that the flame cannot melt the fireproof component 17, thereby achieving the fireproofness. With respect to the fireproof component 17 made of a mica plate in a specific embodiment, the mica plate has an extremely high melting point (about 1723 □), which meets the requirement on the fireproofness of the fireproof component 17, and the mica plate also has excellent processing properties. The fireproof component 17 is not limited to the embodiment of mica plate.

Figure 8:
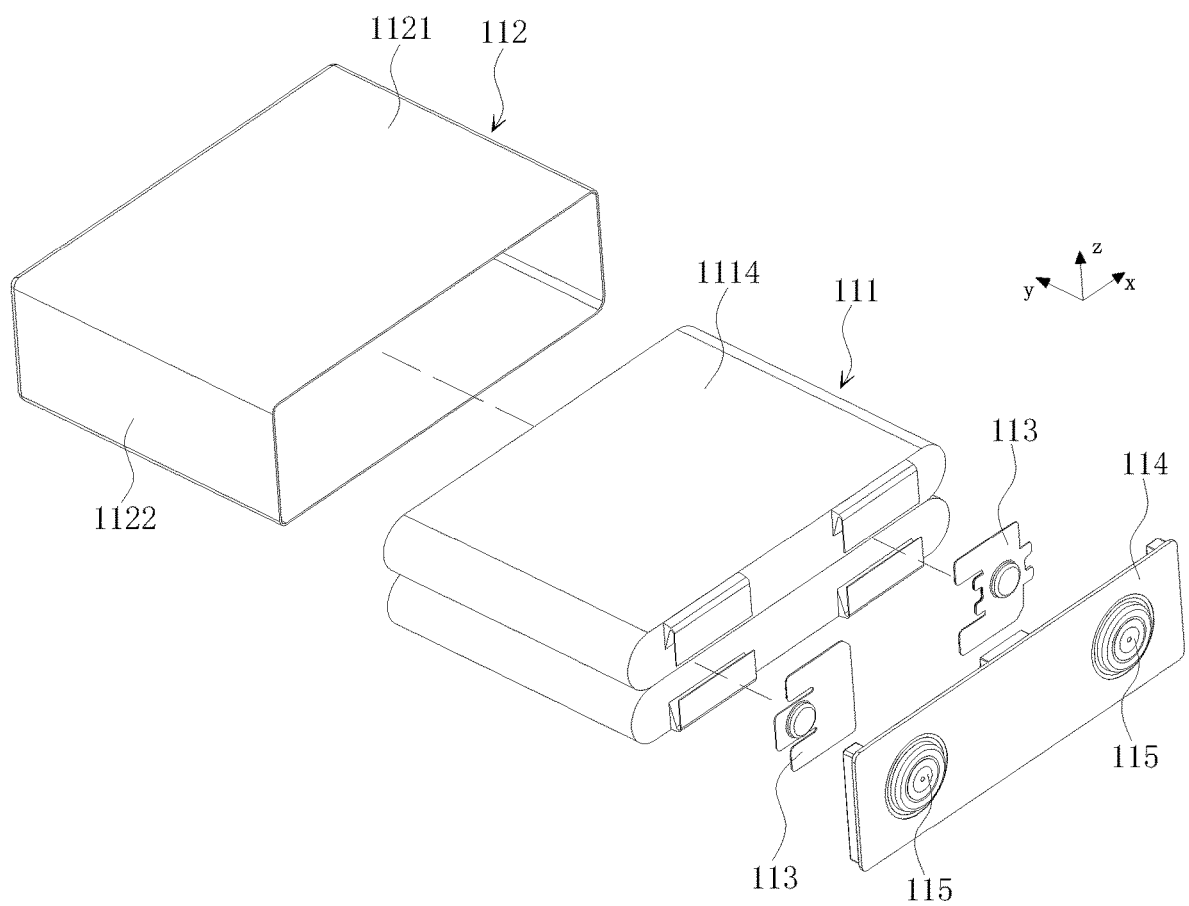
FIG. 8 is an exploded view of a battery unit according to a specific embodiment.

As shown in FIG. 8, the battery unit 11 includes an electrode assembly 111, a battery casing 112, electrode terminal connectors 113, a cover plate 114, and electrode terminals 115. The battery casing 112 can have a hexahedral shape or any other shape. The battery casing 112 has an inner space for accommodating the electrode assembly 111 and the electrolyte, and an opening. The electrode assembly 111 is accommodated in the battery casing 112, the cover plate 114 covers the opening and configured to enclose the electrode assembly 111 in the battery casing 112, and the electrode assembly 111 is electrically connected to the electrode terminals 115 through the electrode terminal connectors 113. In the present embodiment, there are two electrode terminal connectors 113, i.e., a positive terminal connector 113 and a negative terminal connector 113. The battery casing 112 can be made of a material such as aluminum, aluminum alloy, or plastic.

The electrode assembly 111 is accommodated in the battery casing 112 and include a first electrode plate 1111, a second electrode plate 1112, and a separator 1113 disposed between the first electrode plate 1111 and the second electrode plate 1112. The first electrode plate 1111 is a positive electrode plate or a negative electrode plate, and the second electrode plate 1112 has opposite polarity to the first electrode plate 1111, i.e., the second electrode plate 1112 is a negative electrode plate or a positive electrode plate. The separator 1113 is an insulator interposed between the first electrode plate 1111 and the second electrode plate 1112. The electrode assembly 111 can be in form of a wound structure (as shown in FIG. 9) or a layered structure (FIG. 10).

For purpose of illustration, the first electrode plate 1111 is a positive electrode plate and the second electrode plate 1112 is a negative electrode plate. In other embodiments, it is possible that the first electrode plate 1111 is a negative electrode plate and the second electrode plate 1112 is a positive electrode plate. In addition, a positive electrode active material is coated on a coating region of the positive electrode plate, and a negative electrode active material is coated on a coating region of the negative electrode plate. An uncoated region extending from each coating region acts as a tab. The electrode assembly 111 includes two tabs, i.e., a positive tab and a negative tab. The positive tab extends from the coating region of the positive electrode plate, and the negative tab extends from the coating region of the negative electrode plate. The positive electrode tab is electrically connected to the positive electrode terminal 115 through the positive electrode terminal connector 113, and the negative electrode tab is electrically connected to the negative electrode terminal 115 through the negative electrode terminal connector 113.

The battery casing 112, in an approximately hexahedral form, includes two first surfaces 1121 and two second surfaces 1122. Each of the first surfaces 1121 has a larger area than each of the second surfaces 1122. In the battery module 1, the two second surfaces 1122 of each battery unit 11 are opposite to each other in the horizontal direction (for example, the length direction indicated by arrow x), and the two first surfaces 1121 of each battery unit 11 are opposite to each other in the vertical direction (the direction indicated by arrow z).

Figure 9:
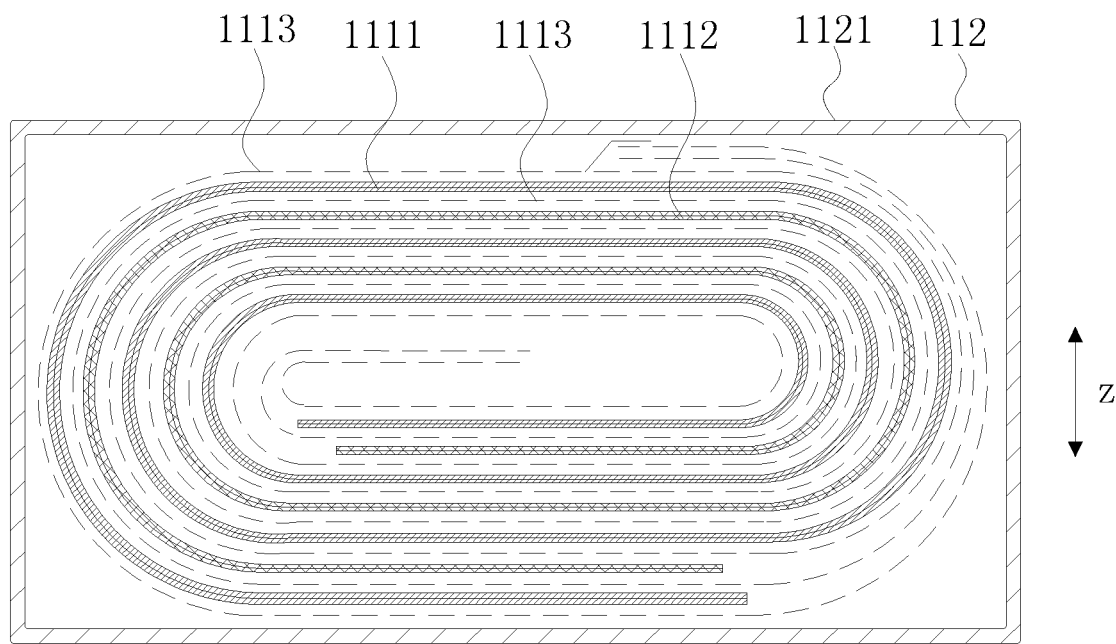
FIG. 9 is a cross-sectional view of an electrode assembly in form of a wound structure according to a specific embodiment.
Figure 10:
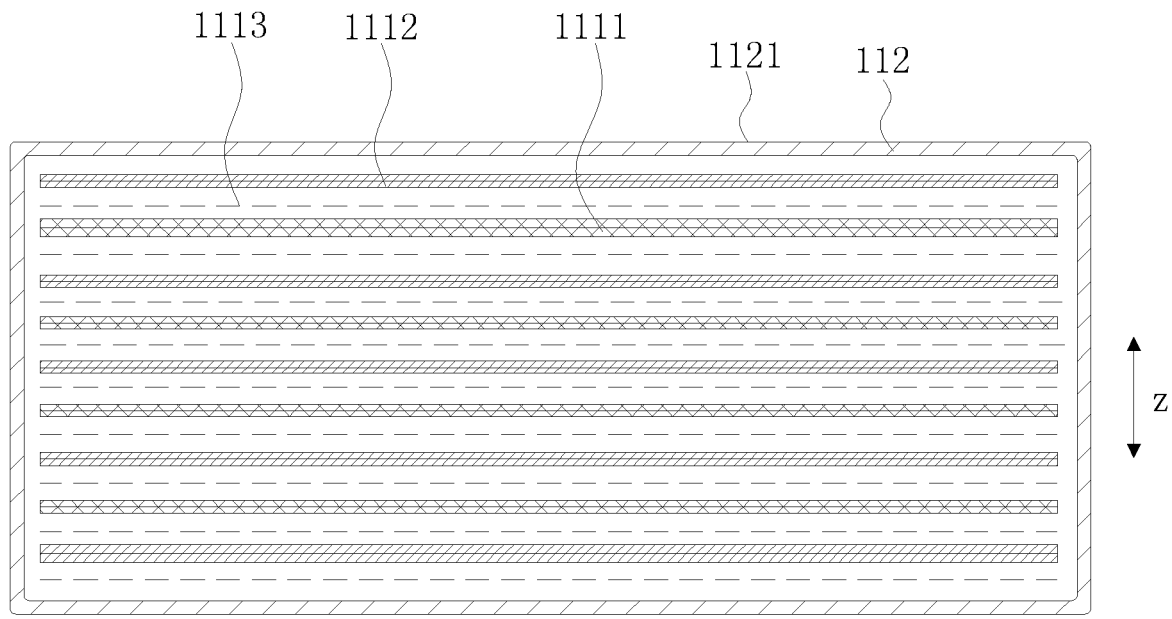
FIG. 10 is a cross-sectional view of an electrode assembly in form of a layered structure according to a specific embodiment.

When the electrode assembly 111 is in form of a wound structure, as shown in FIG. 9, the electrode assembly 111 is flat, and the outer surfaces of the electrode assembly 111 include two flat surfaces 1114. The two flat surfaces 1114 are opposite to one another in the vertical direction (the direction indicated by arrow z). In other words, the flat surfaces 1114 are opposite to the first surfaces 1121. The electrode assembly 111 has an approximately hexahedral form, and the flat surface 1114 is substantially parallel to a winding axis and is an outer surface having the largest area. The flat surface 1114 can be a relatively flat surface, rather than a strictly flat surface.

When the electrode assembly 111 is in form of a layered structure, as shown in FIG. 10, the first electrode plate 1111, the separator 1113, and the second electrode plate 1112 are stacked in the vertical direction (the direction indicated by arrow z), i.e., the first electrode plate 1111 is opposite to the first surface 1121.

During a charging and discharging process, the electrode assembly 111 inevitably expands in a thickness direction of the first electrode plate 1111. In the electrode assembly 111 of the wound structure, an expansion force is greatest in a direction perpendicular to the flat surface 1114. In the electrode assembly 111 of the layered structure, the expansion force is greatest in a stacking direction of the first electrode plate 1111 and the second electrode plate 1112.

The electrode assembly 111 can adopt the wound structure or the layered structure. When the electrode assembly 111 is in form of the wound structure, the flat surfaces 1114 are located in the vertical direction (the direction indicated by arrow z). When the electrode assembly 111 is in form of the layered structure, the first electrode plate 1111 and the second electrode plate 1112 are stacked in the vertical direction (the direction indicated by arrow z). It can be seen that, whether the electrode assembly 111 adopts the wound structure or the layered structure, the maximum expansion force applied by the electrode assembly 111 on the battery casing 112 is oriented in the vertical direction.

On the contrary, in the battery unit 11 of the battery module 1 in the related art, the maximum expansion force applied by the electrode assembly 111 on the battery casing 112 is always oriented in the horizontal direction. The battery module 1 has a much greater size in the horizontal direction than that in the vertical direction. For example, due to the limitation on the height of a vehicle chassis, more battery units 11 have to be stacked in the horizontal direction, the expansion force is accumulated in the horizontal direction. In this regard, the battery module 1 is subjected to an extremely great expansion force in the horizontal direction, and it is necessary to provide very thick end plates on both sides of the battery module 1 in the horizontal direction to resist the expansion force. However, the increased thickness of the end plates can lower the energy density of the battery module 1. In the present embodiment, as the maximum expansion force applied by the electrode assembly 111 on the battery casing 112 is oriented in the vertical direction and the number of battery units 11 stacked in the vertical direction is smaller, the maximum expansion force of the battery module 1 is substantially reduced when compared with the related art.

The battery unit 11 can produce gas in the battery casing 112 during the charging and discharging process, the produced gas exerts a force on the battery casing 112, thereby intensifying the expansion of the battery casing 112. In the present disclosure, as the first surface 1121 has a larger area than the second surface 1122 and the two first surfaces 1121 of the battery unit 11 are opposite to each other in the vertical direction, the maximum force applied by the produced gas on the battery casing 112 is also oriented in the vertical direction. Compared with the related art, the maximum expansion force of the battery module 1 is further reduced.

It should be understood that the embodiments according to the present disclosure discussed above are merely illustrative embodiments, but not intended to limit the present disclosure. The technical solution according to the present disclosure can be modified or changed in various manners. Based on the description or the accompanying drawing, any modifications, equivalent replacements, improvements, and direct or indirect applications in other related arts should fall within the scope of protection of the present disclosure.

What is claimed is:

1. A battery module, comprising:
    at least one battery unit array structure (10), each of the at least one battery unit array structure (10) comprising a plurality of battery units (11) and a plurality of busbars (12) electrically connected to the plurality of battery units (11);
    an upper cover (13);
    a lower cover (14), the at least one battery unit array structure (10) being disposed between the upper cover (13) and the lower cover (14); and
    a fireproof component (17) disposed vertically and configured to block flame and high-temperature particles ejected from the vent (116),
    wherein each of the plurality of battery units (11) in each of the at least one battery unit array structure (10) is provided with a vent (116) facing towards the fireproof component (17);
    wherein the at least one battery unit array structure (10) comprises two or more battery unit array structures (10) comprising a first battery unit array structure (101) and a second battery unit array structure (102) adjacent to the first battery unit array structure (101);
    wherein the fireproof component (17) comprises a fireproof main body (171) extending along a substantially vertical direction, and a first extension portion (172) connected to an upper end of the fireproof main body (171) and extending towards the first battery unit array structure (101), the fireproof component (17) further comprises a second extension portion (173) connected to the upper end of the fireproof main body (171) and extending towards the second battery unit array structure (102); and the first extension portion (172) and the second extension portion (173) are configured to prevent flame and high-temperature particles ejected from the vent (116) from ejecting upwards in a substantially vertical direction;
    wherein the vent (116) of each of the plurality of battery units (11) of the first battery unit array structure (101) and the vent (116) of each of the plurality of battery units (11) of the second battery unit array structure (102) both face towards the fireproof main body (171), and the fireproof main body (171) is disposed between the vent (116) of each of the plurality of battery units (11) of the first battery unit array structure (101) and the vent (116) of each of the plurality of battery units (11) of the second battery unit array structure (102);
    wherein the battery module further comprises a fire-extinguishing component (18), wherein the fire-extinguishing component (18) is provided below the lower cover (14), and the fire-extinguishing component (18) is provided with a fluid passageway for storing a fire-extinguishing liquid for extinguishing the flame and cool the high-temperature particles blocked by the fireproof component (17).

2. The battery module according to claim 1, wherein the fireproof component (17) comprises a third extension portion (174) connected to an upper end of the fireproof main body (171) and extending towards the plurality of battery units (11) in a predetermined direction; and/or
    the fireproof component (17) comprises a fourth extension portion (175) connected to a lower end of the fireproof main body (171) and extending towards the plurality of battery units (11) in the predetermined direction.

3. The battery module according to claim 1, wherein one battery unit array structure (10) of the at least one battery unit array structure (10) further comprises a collecting plate (15), and the collecting plate (15) is disposed at a side of the one battery unit array structure (10) and connected to the plurality of battery units (11) of the one battery unit array structure (10).

4. The battery module according to claim 1, wherein the fireproof component (17) has a melting point higher than or equal to 500° C.

5. The battery module according to claim 4, wherein the fireproof component (17) is made of a mica plate.

6. The battery module according to claim 1, wherein each of the two or more battery unit array structures (10) has a lower surface fixed to the lower cover (14) through a structural adhesive and an upper surface fixed to the upper cover (13) through a structural adhesive.

7. The battery module according to claim 1, wherein the fireproof main body (171), the first extension portion (172) and the second extension portion (173) are formed into one piece.

8. A battery pack, comprising
    an accommodating box; and
    a plurality of battery modules (1) accommodated in the accommodating box, wherein the plurality of battery modules (1) each comprising:
    at least one battery unit array structure (10), each of the at least one battery unit array structure (10) comprising a plurality of battery units (11) and a plurality of busbars (12) electrically connected to the plurality of battery units (11);
    an upper cover (13);
    a lower cover (14), the at least one battery unit array structure (10) being disposed between the upper cover (13) and the lower cover (14); and
    a fireproof component (17) disposed vertically and configured to block flame and high-temperature particles ejected from the vent (116),
    wherein each of the plurality of battery units (11) in each of the at least one battery unit array structure (10) is provided with a vent (116) facing towards the fireproof component (17);
    wherein the at least one battery unit array structure (10) comprises two or more battery unit array structures (10) comprising a first battery unit array structure (101) and a second battery unit array structure (102) adjacent to the first battery unit array structure (101);
    wherein the fireproof component (17) comprises a fireproof main body (171) extending along a substantially vertical direction, and a first extension portion (172)

connected to an upper end of the fireproof main body (171) and extending towards the first battery unit array structure (101), the fireproof component (17) further comprises a second extension portion (173) connected to the upper end of the fireproof main body (171) and extending towards the second battery unit array structure (102); and the first extension portion (172) and the second extension portion (173) are configured to prevent flame and high-temperature particles ejected from the vent (116) from ejecting upwards in a substantially vertical direction;

wherein the vent (116) of each of the plurality of battery units (11) of the first battery unit array structure (101) and the vent (116) of each of the plurality of battery units (11) of the second battery unit array structure (102) both face towards the fireproof main body (171), and the fireproof main body (171) is disposed between the vent (116) of each of the plurality of battery units (11) of the first battery unit array structure (101) and the vent (116) of each of the plurality of battery units (11) of the second battery unit array structure (102);

wherein the battery module further comprises a fire-extinguishing component (18), wherein the fire-extinguishing component (18) is provided below the lower cover (14), and the fire-extinguishing component (18) is provided with a fluid passageway for storing a fire-extinguishing liquid for extinguishing the flame and cool the high-temperature particles blocked by the fireproof component (17).

\* \* \* \* \*